United States Patent [19]
Toda

[11] Patent Number: 5,900,697
[45] Date of Patent: * May 4, 1999

[54] VEHICLE DISCHARGE LAMP LIGHTING CIRCUIT WITH CURRENT-LIMITING DC IMPEDANCE

[75] Inventor: Atsushi Toda, Shizuoka, Japan

[73] Assignee: Koito Manufacturing Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/814,829

[22] Filed: Mar. 11, 1997

[30] Foreign Application Priority Data

Mar. 11, 1996 [JP] Japan .................................. 8-052891

[51] Int. Cl.$^6$ .................................................... H05B 37/02
[52] U.S. Cl. ............................ 315/82; 315/224; 307/10.8
[58] Field of Search ..................... 315/82, 224; 307/10.8

[56] References Cited

U.S. PATENT DOCUMENTS

| | | | |
|---|---|---|---|
| 5,068,570 | 11/1991 | Oda et al. | 315/128 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/127 |
| 5,212,428 | 5/1993 | Sasaki et al. | 315/308 |
| 5,278,452 | 1/1994 | Matsumoto et al. | 307/10.8 |
| 5,295,036 | 3/1994 | Yagi et al. | 361/79 |
| 5,422,548 | 6/1995 | Yamashita et al. | 315/308 |
| 5,449,973 | 9/1995 | Yamashita et al. | 315/82 |
| 5,465,029 | 11/1995 | Hanazaki et al. | 315/224 X |
| 5,485,059 | 1/1996 | Yamashita et al. | 315/307 |
| 5,486,740 | 1/1996 | Yamashita et al. | 315/308 |
| 5,514,935 | 5/1996 | Oda et al. | 315/82 |

OTHER PUBLICATIONS

Gottlieb, "Regulated Power Supplies," 4th ed., McGraw–Hill, pp. 282–287, 1992.

Primary Examiner—Benny Lee
Assistant Examiner—Justin P. Bettendorf
Attorney, Agent, or Firm—Sughrue, Mion, Zinn, Macpeak & Seas, PLLC

[57] ABSTRACT

A vehicle discharge lamp lighting circuit which prevents a current larger than the maximum allowable current $IL_{max}$ from flowing in the discharge lamp even if the battery voltage $V_{BATT}$ is higher than the lowest bulb voltage Vz of the discharge lamp. In the vehicle-discharge lamp lighting circuit, $Z > (V_{BATT} - Vz)/IL_{max}$ is established, where Z is the DC impedance in the lighting circuit, except for the discharge lamp 7, as viewed from the DC power source 1, $V_{BATT}$ is the battery voltage which is set to 24V, Vz is the lowest lamp voltage of the discharge lamp 7 which is set to 20V, and $IL_{max}$ is the maximum allowable current which is set to 2.6 A. In this case, $Z = (24V - 20V)/2.6 A \approx 1.54 \Omega$ or higher, e.g., 1.6 $\Omega$. Hence, in the case where $V_{BATT} = 24V$, $Vz = 20V$, and $IL_{max} = 2.6$ A, the DC impedance Z in the lighting circuit, except for the discharge lamp, as viewed from the DC power source is set to 1.54 $\Omega$ or higher ($Z = (24V - 20V)/2.6 A \approx 1.54 \Omega$).

3 Claims, 2 Drawing Sheets

VEHICLE DISCHARGE LAMP LIGHTING CIRCUIT WITH CURRENT-LIMITING DC IMPEDANCE

BACKGROUND OF THE INVENTION

1. Technical Field of the Invention

The present invention relates to a vehicle discharge lamp lighting circuit in which a DC voltage from a DC power source is increased to a predetermined DC voltage, the predetermined DC voltage is converted into a square-wave-shaped AC voltage, and a starting pulse is superposed on the AC voltage to light a vehicle discharge lamp.

2. Description of the Background Art

Previously, in a vehicle discharge lamp lighting circuit of this type, a DC voltage from a DC power source (a battery on the vehicle) is increased to a predetermined DC voltage, the predetermined DC voltage is converted into a square-wave-shaped AC voltage, and a start pulse is superposed on the AC voltage to light a vehicle discharge lamp. FIG. 3 shows the arrangement of a related vehicle discharge lamp lighting circuit. In FIG. 3, reference numeral 1 designates a vehicle battery; 2, a noise filter; 3, a DC-DC converter (or an up-converter having only a boost function); 4, a DC-AC inverter; 5, a control circuit; and 7, a discharge lamp (bulb).

In the vehicle discharge lamp lighting circuit, the noise filter 2 prevents the flow of noise from the DC-DC converter side to the vehicle battery side. The DC-DC converter 3 increases a battery voltage $V_{BATT}$ supplied through the noise filter to a predetermined DC voltage, which is supplied to the DC-AC inverter 4. The boost operation of the DC-DC converter 3 is controlled by the control circuit 5. The DC-AC inverter 4 converts the DC voltage outputted by the DC-DC converter into a square-wave-shaped AC voltage, which is supplied to a starter circuit 6. The starter circuit 6 operates to superpose a starting pulse on the AC voltage outputted by the DC-AC inverter 4, to light a discharge lamp 7.

The noise filter 2, the DC-DC converter 3, the DC-AC inverter 4, and the control circuit 5 form a ballast circuit 8. The internal impedances of the ballast circuit 8 and the starter circuit 6 cause losses to occur. Therefore, in order to increase the ballast efficiency, and to decrease the generation of heat, the internal impedances of the ballast circuit 8 and the starter circuit 6 are decreased as much as possible. In addition, in order to decrease the noise (restriking noise) produced by the discharge lamp, the inductance of the starter circuit 6 is decreased as much as possible to increase the switching of the square waves. The restriking noise is caused because the arc discharge is momentarily suspended when, in the DC-AC inverter 4, the bridge switching operation occurs to invert the direction of flow of current in the discharge lamp 7.

In the vehicle discharge lamp lighting circuit, Vz=20V, where Vz is the lowest lamp voltage of the discharge lamp 7. More specifically, Vz is the voltage provided immediately after the discharge lamp is turned on in the case where the discharge lamp is turned on within a certain time interval after it was last turned on. A maximum allowable current $IL_{max}$ to the discharge lamp 7 is 2.6 A. If a current larger than the maximum allowable current $IL_{max}$ flows to the discharge lamp 7, the bulb must be damaged. On the other hand, for a jump start in a cold environment, the battery voltage $V_{BATT}$ of the vehicle battery 1 is sometimes set at 24V by connecting two 12V batteries in series. In this case, the battery voltage $V_{BATT}$ is higher than the lowest tube voltage Vz of the discharge lamp 7, and the boost operation of the DC-DC convert 3 is stopped. In this case, the internal impedances of the ballast circuit 8 and the starter circuit 6 are decreased as much as possible, and therefore a current over the maximum allowable current $IL_{max}$ flows in the discharge lamp 7. In other words, since $V_{BATT}$ is larger than Vz, the exceeding voltage is also applied to the lighting circuit. That is, a current IL, which is calculated by dividing the exceeding voltage by sum of the resistances of the entire lighting circuit, and if the current IL is larger than $IL_{max}$ the bulb is damaged.

SUMMARY OF THE INVENTION

An object of the invention is to overcome the above-described difficulties. More specifically, an object of the invention is to provide a vehicle discharge lamp lighting circuit which, even if the battery voltage $V_{BATT}$ is higher than the lowest bulb voltage Vz of the discharge lamp, prevents a current larger than the maximum allowable current $IL_{max}$ from flowing in the discharge lamp.

The foregoing object has been achieved by providing a vehicle discharge lamp lighting circuit in which the DC impedance Z in the lighting circuit, except for the discharge lamp, as viewed from the DC power source satisfies the following relation:

$$Z > (V_{BATT} - Vz)/IL_{max}$$

Hence, in the case where $V_{BATT}$=24V, Vz=20V, and $IL_{max}$=2.6 A, the DC impedance Z in the lighting circuit, except for the discharge lamp, as viewed from the DC power source is set to 1.54 Ω or higher (Z=(24V−20V)/2.6 A≈1.54 Ω).

In a preferred embodiment, the DC impedance Z in the lighting circuit, except for the discharge lamp, as viewed from the DC power source is set to 1.6 Ω or higher. Of course, in the case where $V_{BATT}$=24V, Vz=20V, and $IL_{max}$= 2.6 A, when Z is 1.6 Ω or higher, the equation $Z > (V_{BATT} - Vz)/IL_{max}$ is satisfied.

DETAILED DESCRIPTION OF THE INVENTION

Figure 1:
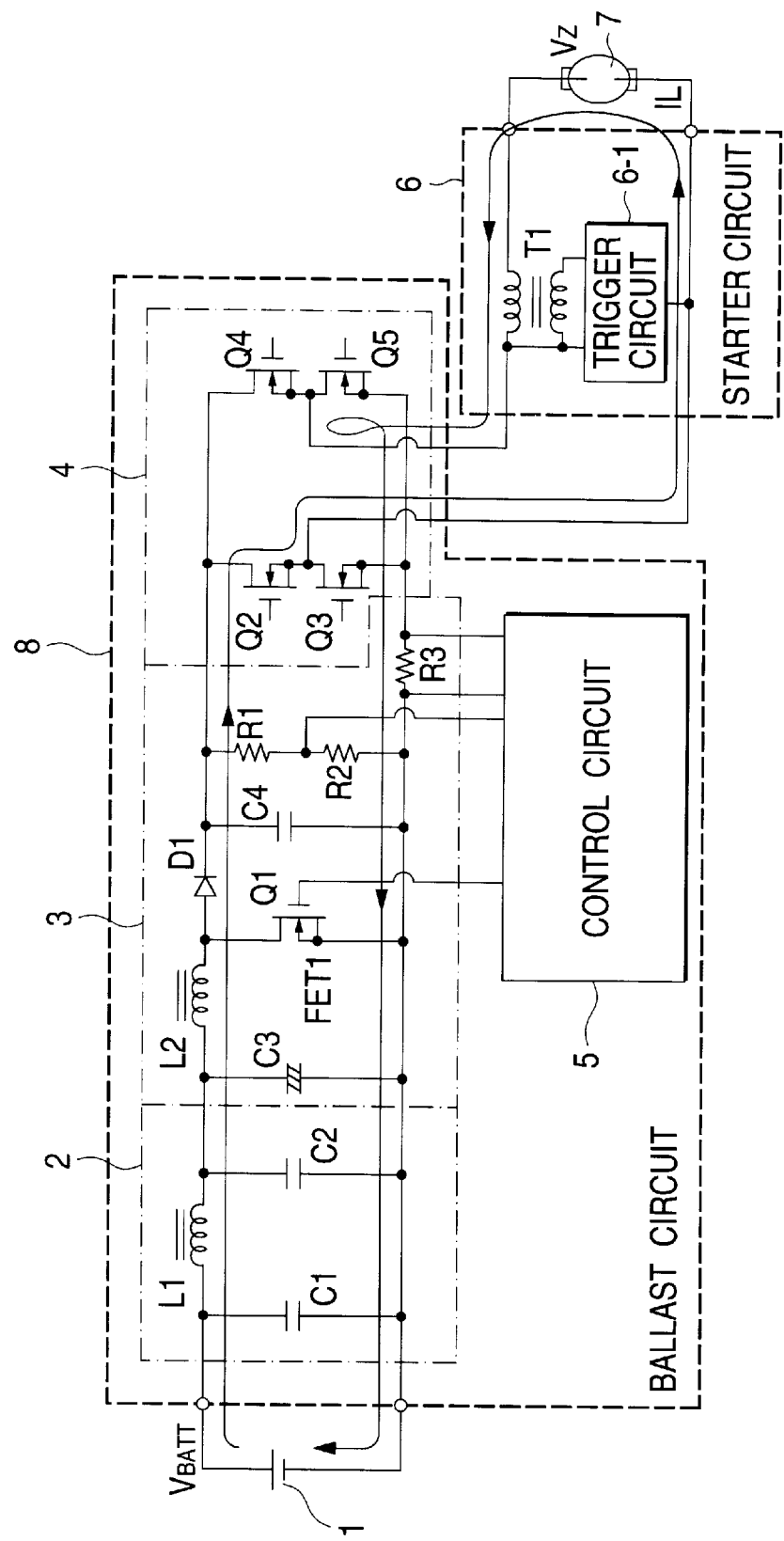
FIG. 1 is a circuit diagram, partly as a block diagram, showing essential circuit elements of a vehicle discharge lamp lighting circuit according to the invention.
Figure 3:
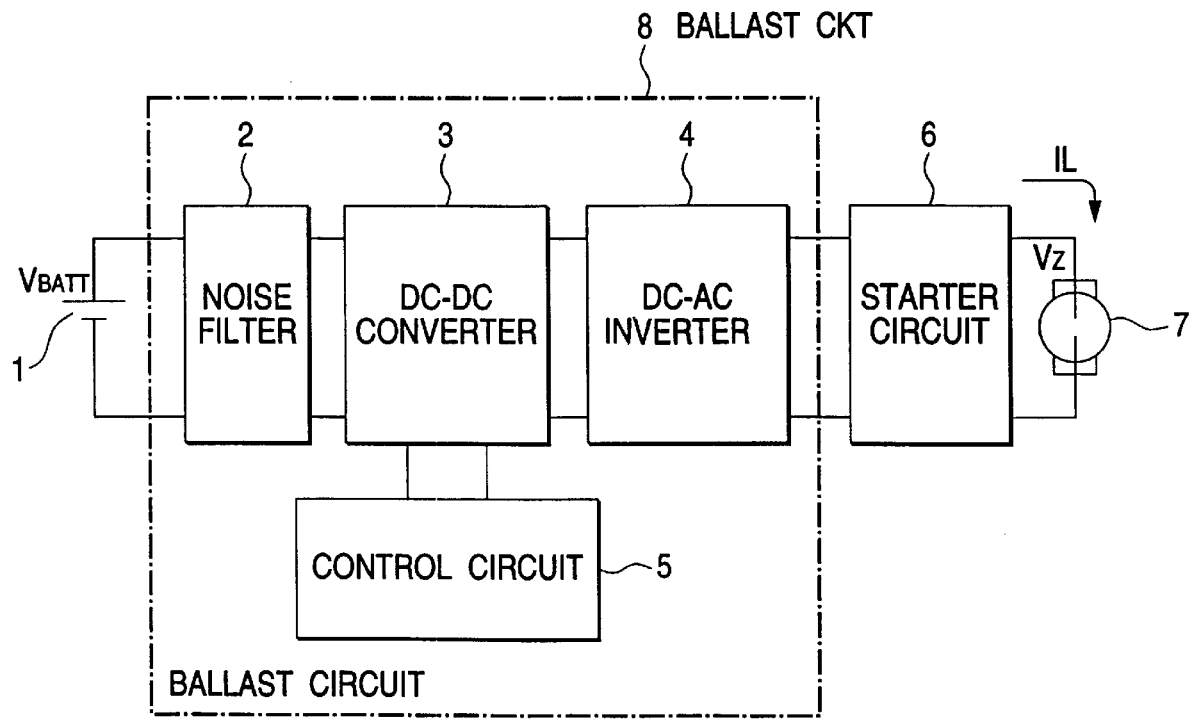
FIG. 3 is a block diagram showing essential parts of a related vehicle discharge lamp lighting circuit.

This invention will be described with reference to a preferred embodiment. FIG. 1 is a circuit diagram showing essential parts of a vehicle discharge lamp lighting circuit, according to the preferred embodiment of the invention. In FIG. 1, parts corresponding functionally to those already described with reference to FIG. 3 are therefore designated by the same reference numerals or characters.

In the embodiment, the noise filter 2 is made up of an inductance L1 and capacitors C1 and C2. The DC-DC converter 3 is an up-converter having only a boost function, and comprises an inductance L2, a diode D1, capacitors C3 and C4, an FET Q1, and resistors R1 through R3. The DC-AC inverter 4 comprises FETs Q2 through Q5. The starter circuit 6 includes a trigger circuit 6-1, and a transformer T1.

As was described above, the DC-DC converter is an up-converter. Therefore, the current flowing in the inductance L2 flows towards the discharge lamp 7 independently of the "on" or "off" state of the FET Q1. Hence, the current flows continuously from the vehicle battery 1. Thus, the circuit can be excellent in noise performance when compared with a circuit employing a fly-back converter.

In the vehicle discharge lamp lighting circuit, the lowest lamp voltage Vz of the discharge lamp is set to 20V, and the maximum allowable current $IL_{max}$ to the discharge lamp 7 is set to 2.6 A. If, in this case, the battery voltage $V_{BATT}$ of the vehicle battery 1 is set to 24V, then the battery voltage $V_{BATT}$ is higher than the lowest lamp voltage Vz of the discharge lamp 7, and the boost operation of the DC-DC converter 3 is stopped. When the boost operation of the DC-DC converter 3 is stopped in the above-described manner, a current flows in the lighting circuit as indicated by the arrow. In this connection, it should be noted that FIG. 1 shows the flow of current with FETs Q2 and Q5 in "on" state (rendered conductive).

In this case, the current flowing in the inductance L2 is a direct current, and therefore the inductance L2 is not a coil but merely a copper wire (copper wire resistance $R_{L2}$=DC impedance). The same thing may be said about the inductance L1 (copper wire resistance $R_{L1}$=DC impedance). On the other hand, the DC-AC inverter provides a 500 Hz square wave output; however, the output is a direct current with the exception of the square wave components. Hence, the transformer T1 may be considered as a copper wire (copper wire resistance $R_{T1}$=DC impedance. As is apparent from the above description, these parts may be considered as DC impedances. In the DC-AC inverter 4, the pairs of FETs Q2 and Q5 and FETs Q3 and Q4 are alternately turned on, to form square waves. When an FET is turned on (rendered conductive), it may be considered as a resistor having a very low resistance (on-resistance $R_{FET}$).

Figure 2:
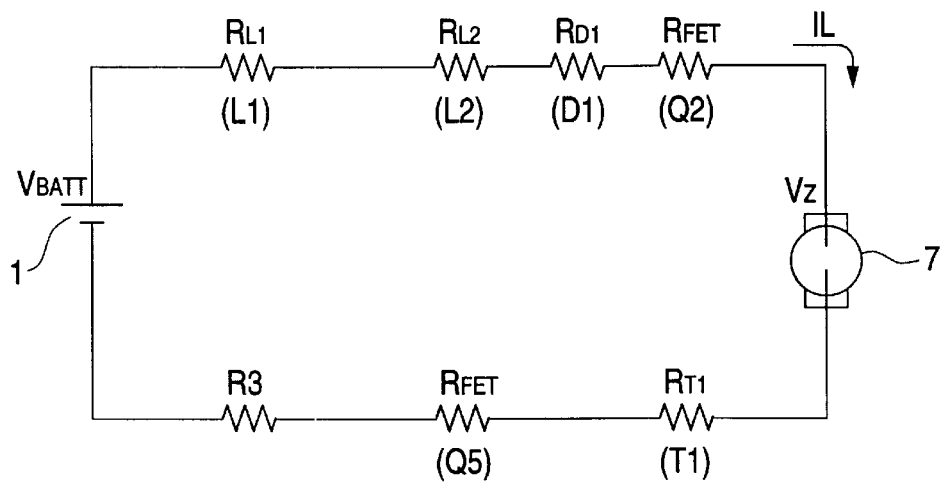
FIG. 2 is a diagram showing the impedances in the lighting circuit in the case where the boost operation of the DC-DC converter is stopped.

FIG. 2 shows impedances in the case where, in the lighting circuit, the boost operation of the DC-DC converter is stopped, that is, $V_{BATT}$>Vz. A current IL which flows in the discharge lamp 7 immediately after the latter 7 is turned on is as follows:

$$IL=(V_{BATT}-Vz)/(R_{L1}+R_{L2}+R_{D1}+R_{FET}+R_{T1}+R_{FET}+R_3),$$ because $V_{BATT}$ is larger than Vz.

If Z is taken as the sum of the resistances $R_{L1}+R_{L2}+R_{D1}+R_{FET}+R_{T1}+R_{FET}+R_3$, and if $Z_{LAMP}$ is the resistance of the lamp 7, then the above equation can be derived as follows:

$$IL = \frac{V_{BATT}}{Z+Z_{LAMP}} = \frac{V_{BATT}}{Z+\frac{V_Z}{IL}} = \frac{V_{BATT} \cdot IL}{Z \cdot IL + V_Z}$$

Therefore, $$IL(Z \cdot IL+V_z)=V_{BATT} \cdot IL,$$

$$Z \cdot IL^2+IL \cdot V_Z=V_{BATT} \cdot IL,\text{ and}$$

$$Z \cdot IL+V_Z=V_{BATT},\text{ and}$$

$$IL = \frac{V_{BATT}-V_Z}{Z}$$

Since $Z=R_{L1}+R_{L2}+R_{D1}+R_{FET}+R_{T1}+R_{FET}+R_3$, the above equation can be rewritten as:

$$IL=(V_{BATT}-Vz)/(R_{L1}+R_{L2}+R_{D1}+R_{FET}+R_{T1}+R_{FET}+R_3),$$

which is the same equation above.

In order to inhibit the flow of a current larger than the maximum allowable current $IL_{max}$=2.6 A, the following condition should be established:

$$IL_{max} > IL, \text{ then } IL_{max} > (V_{BATT}-Vz)/(R_{L1}+R_{L2}+R_{D1}+R_{FET}+R_{T1}+R_{FET}+R_3),$$
therefore,
$$(R_{L1}+R_{L2}+R_{D1}+R_{FET}+R_{T1}+R_{FET}+R_3) > (V_{BATT}-Vz)/IL_{max}.$$

If it is assumed that $(R_{L1}+R_{L2}+R_{D1}+R_{FET}+R_{T1}+R_{FET}+R_3)=Z$, then $Z>(V_{BATT}-Vz)/IL_{max}$. That is, $Z>(24V-20V)/2.6$ A. Therefore, $Z>1.54$ Ω

That is, in the case where $V_{BATT}$=24V, Vz=20V, and $IL_{max}$=2.6 A, Z>1.54 Ω according to the relation $Z>(V_{BATT}-Vz)/IL_{max}$. In a preferred embodiment, Z is set, for instance, to 1.6 Ω. Hence, even if $V_{BATT}$ is set to 24V, a current larger than the maximum allowable current $IL_{max}$ will not flow in the discharge lamp 7.

In the embodiment, $Z=(R_{L1}+R_{L2}+R_{D1}+R_{FET}+R_{T1}+R_{FET}+R_3)$. In this case, Z is the DC impedance in the light circuit, except for the discharge lamp 7, as viewed from the vehicle battery 1. Hence, if there is any other DC component, it should be included in the impedance.

At the application of a surge, the lamp should be turned off, because the internal electronic components can be decreased in withstanding voltage; that is, it results in a reduction in total cost.

As is apparent from the above description, the DC impedance Z in the lighting circuit, except for the discharge lamp, as viewed from the DC power source satisfies the following relation: $Z>(V_{BATT}-Vz)/IL_{max}$. Hence, in the case where $V_{BATT}$=24V, Vz=20V, and $IL_{max}$=2.6 A, Z=(24V−20V)/2.6 A≈1.54 Ω), Z=(24V−20V)/2.6 A≈1.54 Ω or higher. Therefore, even if $V_{BATT}$=24V, a current larger than the maximum allowable current $IL_{max}$=2.6 A will not flow in the discharge lamp.

What is claimed is:

1. A vehicle discharge lamp lighting circuit in which a DC voltage from a DC power source is increased to a predetermined DC voltage, the predetermined DC voltage is converted into a square-wave-shaped AC voltage, and a start pulse is superposed on the AC voltage to light a discharge lamp, wherein a DC impedance Z in said lighting circuit, except for the discharge lamp, as viewed from the DC power source satisfies the following relation:

$$Z>(V_{BATT}-Vz)/IL_{max},$$

where $V_{BATT}$ is a voltage of the DC power source,

Vz is a lowest steady-state lamp voltage of the discharge lamp after the lamp has been turned on and $V_{BATT}$ is greater than Vz and, $IL_{max}$ is a maximum allowable current to the discharge lamp.

2. A vehicle discharge lamp lighting circuit in which a DC voltage from a DC power source is increased to a predetermined DC voltage, the predetermined DC voltage is converted into a square-wave-shaped AC voltage, and a start pulse is superposed on the AC voltage to light a discharge lamp, wherein a DC impedance Z in said lighting circuit, except for the discharge lamp, as viewed from the DC power source is at least 1.6 Ω.

3. A vehicle discharge lamp lighting circuit as claimed in claim 2, wherein the voltage $V_{BATT}$ of the DC power source is 24V, the lowest lamp voltage Vz of the discharge lamp is 20V, and the maximum allowable current of said discharge lamp $IL_{max}$ is 2.6 A.

* * * * *